Patented Oct. 9, 1928.

1,687,060

UNITED STATES PATENT OFFICE.

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK.

CELLULOSE ESTERS CONTAINING HALOGENATED ACYL GROUPS AND PROCESSES OF MAKING SAME.

No Drawing.   Application filed May 4, 1927. Serial No. 188,859

This invention relates to cellulose esters containing acyl groups which have been halogenated, especially acyl groups containing halogenated chains. It also relates to processes of making such esters.

One object of the invention is to produce esters containing such halogenated groups, whether they be the only acyl groups in the ester or whether there be other acyl groups present along with the halogenated ones. Another object of the invention is to provide esters of this character which are soluble in useful organic neutral solvents, and yield transparent films, many of them highly flexible and highly resistent to burning. Another object of the invention is to provide a simple, relatively inexpensive and easily controlled process for making such esters. Other objects will hereinafter appear.

So far as we are aware, previous attempts to obtain cellulose esters in which the acyl groups contain halogenated chains have not succeeded. Where attempts have been made to esterify cellulose with an acid or anhydrid containing a halogen substituted chain, such as chloroacetic acid for instance, no appreciable esterification has taken place until the cellulose molecule has been broken down to the point where it is no longer cellulose but has become cellobiose, or a similar material. See, for example, Wiener Monatshefte f. Chemie 1905, vol. 26, pages 1459 to 1472. In general, the substitution of a halogen in a fatty acid, whether acetic or any of the others, up to and including stearic, prevents esterification of cellulose by the halogen substituted acid under useful conditions where the cellulose is not broken down.

In another prior research described in Zeitschrift fur Angewandte Chemie 1913, vol. 26, page 137, a description is given of esters of hydrocellulose containing one monochlor benzoic group for each six carbon atoms in the cellulosic group. The product was not soluble in any of the useful organic solvents and the halogen was in the ring and not in the chain.

We have now prepared cellulose esters containing acyl groups in which there is a halogen substituted chain, some of these esters containing only such groups, and other containing such halogenated groups along with other acyl groups. Among these esters we have produced certain ones which are soluble in one or more useful organic solvents, such as acetone, chloroform, benzol, etc. Moreover we have prepared cellulose esters having halogenated acyl groups which are highly resistent to burning. In fact, many esters containing brominated acyl groups are incapable of sustaining combustion in air for any length of time, ignited strips of them repeatedly going out. Those which are soluble in neutral organic solvents, yield flexible, transparent films from their solutions, and such films have the resistance to burning which is inherent in the esters containing the suitably halogenated acyl groups.

We have found that such esters may be obtained by first preparing a cellulose ester containing an unsaturated acyl group, and thereafter halogenating said unsaturated group instead of attempting to esterify cellulose with previously halogenated acyl groups, we perform the halogenation after the ester has been formed. In this way we avoid the practically complete resistance to esterification of acyl groups containing halogenated chains.

In the preparation of our novel esters we prefer to esterify the cellulose with one or more acyl groups corresponding to one or more monocarboxylic unsaturated organic acids in which there is an ethylenic bond. For example, the series of acids beginning with acrylic, and those which may be considered as derived by substitution, such as cinnamic acid, may readily be employed. Of the acids in the acrylic series, crotonic and undecylenic are representatives of the lower and higher members respectively and will be used, therefore, in the following illustration; but it will be understood that our invention is not limited to these illustrative compounds, except as indicated in the appended claims.

After the esters with unsaturated groups have been formed, the unsaturated bonds may be opened up and substitution effected therein by any of the well known chemical expedients for forming addition products in double bonded chains. Since we have found the results to be best when the chains are halogenated, say with chlorine or bromine, we shall refer to the latter in our illustrations, but it will be further understood that our invention is not restricted to such details, except as defined in the claims.

In one example of our invention 3 parts by weight of cotton tissue paper, such as is used in the manufacture of cellulose acetate, is added to a mixture of 15 parts by weight of cinnamic acid, 40 parts by weight of chloro-acetic anhyrid and .05 parts by weight of magnesium perchlorate. The thoroughly mixed reaction mass is then warmed at 60 to 65° C. until the fibres disappear and a more or less clear dope is obtained. This may take in the neighborhood of 5 hours. From the reaction mass the cellulose cinnamate is obtained by precipitation in methyl alcohol, and washing with the same. The cellulose cinnamate is then dissolved in chloroform, say about 15 parts by weight of chloroform for each part by weight of the ester. When the solution is completed, there is added to it 3 parts by weight of bromine dissovled in 15 parts by weight of chloroform. The mixture will produce a satisfactory bromination even at room temperature, and after only a comparatively short while, say for about 6 hours. From the chloroform solution the brominated ester is precipitated by means of methyl alcohol, washed and dried. It may contain, by such treatment, as much as 42% of bromine by weight. A completely esterified ester of alpha beta dibromophenyl propionic acid would contain 46.5% of bromine. Our product approaches this closely. A film coated from a solution of this ester is acetone or chloroform, after setting and sufficient drying, is transparent and is incapable of sustaining combustion. Films of cellulose cinnamate will burn moderately, but the introduction of the bromine, by our process, makes the material non-inflammable. This result is obtained without harmful degradation of the cellulose.

In another example, 5 parts by weight of cellulose, say the tissue paper mentioned above, is added to a mixture of 15 parts by weight of crotonic acid, 30 parts by weight of chloroacetic anhydrid and .05 parts by weight of magnesium perchlorate. The thoroughly mixed reaction mass is kept at 60 to 65° C. until the fibers largely disappear and a homogeneous dope is obtained. This generally occurs in about 5 hours. The cellulose crotonate is obtained from the reaction mass by precipitation with a 50% aqueous methyl alcohol solution, and washed with the same liquid. The dried ester is dissolved in chloroform, say 1 part of the ester in 37 parts by weight of chloroform. To this solution there is added 15 parts by weight of chloroform in which are dissolved 1.6 parts by weight of bromine. The mixture is allowed to react at room temperature, for say about 6 hours. It is then precipitated, washed and dried by means of methyl alcohol. The product contains 50% of bromine by weight and is soluble in acetone, chloroform, benzol, or mixtures of them. From its solutions it yields transparent films or varnish layers, which are incapable of sustaining combustion in air. A fully esterified cellulose alpha beta dibromobutyrate would theoretically contain 56.5% of bromine. It will be seen that our product closely approximates this.

In still another illustration of our invention 10 parts by weight of tissue paper of the above kind is added to a mixture of 40 parts by weight of crotonic acid, 30 parts by weight of acetic anhydrid, 30 parts of chloroacetic acid and one-tenth part by weight of magnesium perchlorate. The thoroughly mixed reaction mass is kept at 60 to 65° C. until the fibers disappear and a dope is obtained. The latter is precipitated into methyl alcohol and the cellulose aceto-crotonate washed with the same liquid and dried. 5 parts by weight of this product is dissolved in 75 parts by weight of chloroform and 3.2 parts by weight of liquid bromine thoroughly stirred in. The reaction is allowed to proceed at room temperature for about 2 hours, and the ester precipitated by means of methyl alcohol, washed in the same and dried. It is soluble in acetone and chloroform and contains about 17.3% of bromine by weight. From its solutions it may be formed by spreading and evaporation into flexible, transparent, substantially colorless films or varnish layers which are incapable of sustaining combustion in air for any length of time. Such a film repeatedly goes out automatically and has to be repeatedly lighted to keep it burning. The ester is a cellulose aceto-alpha beta dibromobutyrate.

Relative proportions of the esterified baths may be varied to obtain mixed esters having different proportions of the several kinds of acyl groups. For example, when it is desired to increase the amount of acetic acid groups, and lower the amount of crotonic groups, the procedure may be as follows,— 5 parts by weight of clean cotton cellulose, preferably in the form of tissue paper, is added to a mixture of 12 parts by weight of crotonic acid, 15 parts by weight of acetic anhydrid, 15 parts by weight of chloroacetic acid, and .05 parts by weight of magnesium perchlorate. The mixture is kept at 60 to 65° C. until a fairly clear dope is obtained by the disappearance of the cotton fibers. This often takes about 5 or 6 hours. The mixed ester is obtained from the reaction mass by precipitation in 50% aqueous methyl alcohol, the product being washed with this liquid and then dried. 5 parts by weight of this product is dissolved in 75 parts by weight of chloroform and then 3.2 parts by weight of bromine dissolved in 7.5 parts by weight of chloroform are mixed into the solution of the ester. This is allowed to react at room temperature for about 2 hours, and finally the ester is precipitated by methyl alcohol, washed with the same, and dried. The mixed ester contains 14.5% of bromine and is soluble in acetone, chloroform, or mixtures of them. From its solutions it yields films or varnish coatings which are flexible, transparent, of little or no color, and incapable of sustaining combustion in air for any length of time. A test strip keeps going out and has to be repeatedly lit.

In still another example of our invention 5 parts by weight of suitable cellulose, such as the special tissue paper hereinabove mentioned, are added to a mixture of 15 parts by weight of crotonic acid, 15 parts by weight of acetic anhydrid, .2 parts by weight of copper perchlorate, and 22 parts by weight of chloroform. The mixture is warmed at 60 to 65° C. until a dope is obtained, say in about 28 hours. The cellulose aceto-crotonate is recovered from the mass by precipitation with methyl alcohol, washing with the same, and drying. A solution of 5 parts by weight of this mixed ester in 75 parts by weight of chloroform is treated with 3.2 parts by weight of bromine. The mixture is allowed to stand at room temperature for about 2 hours and the product isolated by precipitation in and washing with methyl alcohol. It contains 14% of bromine and is soluble in acetone, or chloroform, or mixtures of them. It yields flexible, transparent, practically colorless films or skins which are incapable of burning continuously in air.

In yet a different form of our invention 20 parts by weight of long fibered cotton is mercerized for 48 hours at room temperature in an 18% aqueous sodium hydroxide solution. At the end of this period it is washed free from alkali with water, and then the water is removed by washing with a mixture of substantially anhydrous alcohol and ether. Finally it is dried in the air. The mercerized fibers with the specially conditioned surfaces, thus produced, are next heated in a boiling mixture of 500 parts by weight of crotonic acid and 100 parts by weight of chlorobenzene, the temperature being about 155 to 157° C. The water liberated by the esterification reaction is periodically removed by distillation, the chlorobenzene which distills off being replaced with dry chlorobenzene. After 48 hours of this treatment the fibers contain considerable amounts of crotonic groups esterified onto the cellulose, although in this condition the esterification has not been carried far enough to produce solubility in neutral organic solvents. The proportion of crotonic groups in the ester may be increased by carrying the boiling of the mercerized fibers in the crotonic acid-chlorobenzene mixture for a longer time, say 96 hours. This gives a product containing more crotonic groups. The lower crotonates formed, either by the 48 hour treatment, or the 96 hour treatment, are then acetylated, the following procedure being convenient. 5 parts by weight of the lower crotonates are treated in a mixture of 15 parts by weight of acetic anhydrid, 20 parts by weight of acetic acid and .1 parts by weight of magnesium perchlorate. The reaction is conducted at 60 to 65° C. and the cellulose aceto-crotonate, thus produced, is isolated by precipitating and washing, as described above. The product is soluble in chloroform, and yields transparent films of negligible color. 5 parts by weight of this product is dissolved in 75 parts by weight of chloroform containing 3.2 parts of bromine and the mixture allowed to stand at room temperature for about 2 hours. Finally the cellulose aceto-alpha beta dibromobutyrate is precipitated and washed with methyl alcohol and dried. It is soluble in acetone, chloroform, and mixtures of them, and may contain even as much as 8.3% of bromine. It will be understood, of course, that bromine may be introduced even into the insoluble lower crotonates formed during the first stage of this example. The fibers thus obtained are of very low inflammability and susceptible to further chemical or dyeing treatment, by reason of the presence of the bromine in the molecule.

In a still further form of our invention 20 parts by weight of rayon fibers prepared by the cuprammonium process, or the viscose process, are placed in a mixture of 300 parts by weight of crotonic acid and 50 parts by weight of chlorobenzene. The mixture is heated for 48 hours at 155 to 157° C. During this period the chlorobenzene may be distilled off at intervals and replaced by further dry chlorobenzene. This removes the water which is present or formed during the reaction. The rayon fibers which are now lower collulosic esters of crotonic acid, are filtered off from the other ingredients and washed with methyl alcohol. They may be brominated while in this condition; but we prefer to first acetylate them. For this purpose 5 parts by weight of these prepared fibers are then added to a mixture of 30 parts by weight of acetic acid, 20 parts by weight of acetic anhydrid and 1 part by weight of fused zinc chlorid and the mixture warmed at 60 to 65° C. until a homogeneous dope is obtained. From this reaction mixture the cellulose aceto-crotonate is obtained by precipitation with water and washing with water or methyl alcohol.

The product is dissolved in chloroform, say in the proportion of 5 parts by weight of the product in 75 parts by weight of the chloroform. There is then thoroughly mixed with this solution a mixture of 3.2 parts by weight of bromine in 15 parts by weight of chloroform. The reaction mixture thus obtained is kept at room temperature for 2 hours and the cellulose aceto-alpha beta dibromobutyrate precipitated by means of methyl alcohol, washed and dried. The product is soluble in chloroform, or acetone, or mixtures of them, and contains 6% of bromine, which has entered into the double bond in the chain of the crotonic group. It yields transparent, flexible films from its solutions which are highly resistent to burning in air.

In still another procedure 50 parts by weight of acetylation tissue paper are thoroughly mixed into 200 parts by weight of crotonic acid, 200 parts by weight of acetic anhydrid, and .5 parts by weight of copper perchlorate. The mixture is heated at 60 to 65° C. until a homogeneous solution has resulted. This takes place after about 60 hours. The ester is isolated by precipitation in warm methyl alcohol, washed with the same, and dried. A solution of this product, say 75 parts by weight of it in 1120 parts by weight of chloroform, is treated with 48 parts by weight of bromine at room temperature for 2 hours and the addition product isolated, as in previous examples. It contains 16.2 parts of bromine and is soluble in acetone, chloroform, or mixtures of them, and yields from its solution transparent films of very low combustibility.

Instead of mixed esters containing groups from the lower fatty acids, such as acetic acid, we may introduce higher fatty acid groups, such as stearic, palmitic or lauric groups. For example, 4 parts by weight of cotton tissue paper, of the type described above, are mixed into 30 parts by weight of commercial stearic acid, 9 parts by weight of crotonic acid, 50 parts by weight of chloroacetic anhydrid, and .1 part by weight of magnesium perchlorate. This is heated at 60 to 65° C. until a homogeneous dope is obtained, say in about 20 hours. This dope is poured into methyl alcohol to precipitate the cellulose crotono-stearate, and the product is washed with warm methyl alcohol and dried. A solution of this is prepared in chloroform, say 3 parts by weight of it in 45 parts by weight of chloroform and into this solution there are carefully stirred 3.2 parts by weight of bromine. The mixture is kept at least as cool as room temperature, at which it produces useful results in about 2 hours. The brominated ester is precipitated in methyl alcohol and washed. It is soluble in chloroform, benzol, or mixtures of them. But whereas the crotono-stearate was soluble in acetone, the brominated derivative has become insoluble in acetone. This halogenated product contains 30% of bromine and does not burn in air.

Instead of brominating the cellulose crotono-stearate, the product of which is described in the immediately foregoing paragraph, we may chlorinate it. For instance, 5 parts by weight of the mixed ester is dissolved in 75 parts by weight of chloroform, and a current of chlorine is passed intimately through this solution for fifteen minutes. It is then allowed to stand at room temperature for about 2 hours. The product is isolated by precipitation in methyl alcohol, and is washed and dried. It is soluble in chloroform, benzol, and mixtures of them, and from its solution gives transparent films or varnish layers. The introduction of the chlorine causes it to become insoluble in acetone in a way analogous to the result produced by bromination. There is 10% of chlorine present in the product, but films produced from the latter will burn in air in contrast to the remarkable non-inflammability or resistance to burning of the brominated esters.

In still a different illustration of our invention 5 parts by weight of tissue paper, of the kind described above, are thoroughly stirred into a mixture of 15 parts by weight of undecylenic acid, 25 parts by weight of chloroacetic acid, 15 parts by weight of acetic anhydrid, and .05 parts by weight of magnesium perchlorate. The reaction mass is then kept at 60 to 65° C. until a homogeneous dope is obtained, say in about 6 hours. This dope is precipitated with methyl alcohol to obtain the cellulose aceto-undecylenate. The washed and dried product is dissolved in chloroform to which bromine is added, and the mixture kept for a few hours at room temperature in order to brominate the undecylenic group, in the same way that the halogenation was effected in the above examples. The product is soluble in chloroform, and gives films which are transparent, and resistent to combustion. It contains 6.6% of bromine.

While in the above examples, in which mixed esters are produced, we have mentioned only acetic groups and stearic groups from the fatty acid series, it will be understood that groups corresponding to any other acids mentioned in our copending application Serial No. 179,177, filed March 28th, 1927 for process of making cellulose esters of organic acids may be used. Said application refers to the unsubstituted aliphatic monocarboxylic acids, including the cycloparaffinic, the aromatic monocarboxylic acids and the aralkyl monocarboxylic acids, of which group the following acids are typical examples: propionic, n-butyric, isobutyric, n-valeric, iso-valeric, n-caproic, n-heptylic, caprylic, pelargonic, capric, lauric, myristic, palmitic, stearic, crotonic, cyclohexane-carboxylic, benzoic, o-methoxy-benzoic, o-chloro-benzoic, acetyl salicylic, phenylacetic, hydrocinnamic and cinnamic.

Our novel substituted esters may be mixed with other cellulose esters which are soluble in the same solvents, such as cellulose acetate and/or cellulose nitrate, either with or without plasticizers. Thus films may be prepared from such dissolved mixtures. Layers of our substituted esters may likewise be combined with layers of other cellulose esters or ethers in laminated films or other products, a common solvent being present to promote the adherence of the layers in accordance with customary laminating practice. For example, a film of our substituted esters may have a very thin layer of somewhat hygroscopic cellulose acetate on its rear face,—that is, the face opposite the one which receives the photographic emulsion.

In plastic or flowable compositions in which our substituted esters form an essential constituent, there may also be present any of the substances of low volatility commonly colloidized with cellulose acetate in its known compositions, a suitable amount of a common solvent, such as acetone, chloroform, or benzol, or mixtures of them being used. Moreover, the proportions may be approximately the same as those heretofore employed in connection with cellulose acetate.

Our substituted esters may be used in making any of the things hitherto made by employing the previously known cellulose esters. An incomplete but suggestive list of such uses includes molded articles, varnishes and lacquers, coatings for artificial leather, coatings for fabrics, rayon, and photographic films.

Having thus described our invention, what we claim as new and desire to secure by Letters Patent is:

1. A cellulose ester in which there is an acyl group containing a halogen-substituted chain, the halogen being more than 1% of the weight of the ester.
2. A cellulose ester in which there is an acyl group containing a chain in which there are two halogen atoms.
3. A cellulose ester in which there is a halogenated fatty acid group, the halogen being more than 1% of the weight of the ester.
4. A cellulose ester in which there is a dihalogen butyryl group.
5. A cellulose ester in which there is an acyl group containing a brominated chain.
6. A cellulose ester in which there is an acyl group containing a dibrominated chain.
7. A cellulose ester in which there is a brominated fatty acid group, the bromine being more than 6% of the weight of the ester.
8. A cellulose ester in which there is a dibromobutyryl group.
9. A cellulose ester in which there is an acyl group containing a halogen-substituted chain, said ester containing sufficient organic acid groups to render the ester soluble in a volatile neutral organic liquid.
10. A cellulose ester in which there is an acyl group containing a bromine-substituted chain, said ester containing sufficient acyl groups to be soluble in at least one of the solvents chloroform, acetone, benzol.
11. A cellulose ester which is soluble in chloroform and contains a dihalogen butyryl group.
12. A cellulose ester in which there is an acyl group containing a halogen-substituted chain and an unhalogenated fatty acid group.
13. A cellulose ester in which there is a halogenated fatty acid group and an unhalogenated fatty acid group, said ester being soluble in a neutral, volatile, organic liquid.
14. A cellulose ester in which there is a dihalogen butyryl group and an unhalogenated fatty acid group.
15. A cellulose ester in which there is an acyl group containing a brominated chain and an unhalogenated fatty acid group.
16. A cellulose ester in which there is a brominated fatty acid group and an unhalogenated fatty acid group, said ester being soluble in at least one of the group of solvents, acetone, chloroform, benzol.
17. A cellulose ester in which there is a dibromobutyryl group and an unhalogenated fatty acid group.
18. A cellulose ester in which there is an acyl group containing a halogen-substituted chain and a stearyl group.
19. A cellulose ester in which there is an acyl group containing a brominated chain and a stearyl group.
20. Cellulose dibromobutyro-stearate.
21. The process of making substituted organic esters of cellulose which comprises treating cellulosic material containing unesterified hydroxyl groups with an acylating agent containing an unsaturated acyl group until a cellulose ester is formed containing such an unsaturated group and subjecting said ester to a halogenating agent, until at least an addition of halogen is made at the unsaturated part of said acyl group.
22. The process of making halogen-substituted organic esters of cellulose which comprises treating cellulosic material containing unesterified hydroxyl groups with an esterifying agent containing an acyl group corresponding to a monocarboxylic organic acid in which there is an ethylenic bond until a cellulose ester is formed containing such an acyl group, and subjecting said ester to a halogenating agent until halogenation of said acyl group takes place.

23. The process of making halogen-substituted organic esters of cellulose which comprises treating cellulosic material containing unesterified hydroxyl groups with an acylating agent containing an unsaturated acyl group corresponding to an acid of the acrylic series until a cellulose ester of such acid is formed, and subjecting said ester to a halogenating agent until halogenation takes place at the unsaturated acyl group.

24. The process of making halogen-substituted organic esters of cellulose which comprises treating cellulosic material containing unesterified hydroxyl groups with an acylating agent containing a crotonic group, until a cellulose ester is formed containing a crotonic group, and subjecting said ester to a halogenating agent until halogenation takes place at the double bond in said crotonic group.

25. The process of making brominated organic esters of cellulose which comprises treating cellulose with an acylating agent containing an unsaturated acyl group until a cellulose ester is formed containing such a group, and subjecting said ester to a brominating agent until bromine is added to said acyl group.

26. The process of making brominated organic esters of cellulose which comprises treating cellulose with an esterifying bath containing an acyl group corresponding to a monocarboxylic organic acid in which there is an ethylenic bond until a cellulose ester is formed containing an acyl group having an ethylenic bond, and subjecting said ester to a brominating agent until bromine is introduced at said bond.

27. The process of making brominated organic esters of cellulose which comprises treating cellulose with an esterifying bath containing an acyl group corresponding to an acid of the acrylic series, until an ester of cellulose is formed containing such an acyl group, and subjecting said ester to a brominating agent until bromine is added to said group.

28. The process of making brominated organic esters of cellulose which comprises treating cellulose with an esterifying bath containing crotonic groups, until a cellulose ester is formed containing a crotonic group, and brominating said crotonic group.

29. The process of making halogen-substituted organic esters of cellulose which comprises treating cellulosic material containing unesterified hydroxyl groups with an acylating agent containing an unsaturated acyl group until a cellulose ester is formed containing such a group and subjecting said ester to a halogenating agent until substantially two halogen atoms are substituted in said acyl group.

30. The process of making halogen substituted organic esters of cellulose which comprises treating cellulosic material with an esterifying bath containing a monocarboxylic organic acid in which there is an ethylenic bond until a cellulose ester is formed containing an acyl group having such a bond, and brominating said group until substantially two bromine atoms are added at said ethylenic bond.

31. In the process of making halogen-substituted organic esters of cellulose the step of halogenating a cellulose ester in which there is an acyl group containing an ethylenic bond.

32. In the process of making brominated organic esters of cellulose the step of brominating a cellulose ester containing an acyl group which has an ethylenic bond.

33. In the process of making halogen-substituted organic esters of cellulose the step of halogenating a cellulose ester containing a crotonic group.

34. In the process of making brominated organic esters of cellulose the step of brominating a cellulose ester containing a crotonic group.

35. An article of manufacture containing a flexible fire-resisting layer comprising a cellulose ester in which there is an acyl group containing a halogen-substituted chain.

36. As an article of manufacture a flexible fire-resisting film comprising a cellulose ester containing a brom-substituted chain.

37. As an article of manufacture a flexible fire-resisting film comprising a cellulose ester containing a halogenated fatty acid group.

38. As an article of manufacture a flexible fire-resisting film comprising a cellulose ester in which there is a brominated fatty acid group.

39. A film the essential constituent of which is a cellulose ester having a dibrombutyryl group.

40. A film comprising a cellulose ester in which there is an acyl group containing a brominated chain, the bromine being more than 6% of the weight of the ester.

41. A flexible fire-resisting film comprising a cellulose ester containing an acyl group in which there is a halogen-substituted chain and an unhalogenated fatty acid group.

42. As an article of manufacture a film comprising a cellulose ester in which there is a brominated fatty acid group and an unhalogenated fatty acid group.

43. A flexible, transparent, fire-resisting film comprising as an essential constituent cellulose dibromobutyro-stearate.

Signed at Rochester, New York, this 27th day of April, 1927.

HANS T. CLARKE.
CARL J. MALM.